Nov. 12, 1929.                T. E. SELLDEN                1,735,414
                STARTING AIR DISTRIBUTOR FOR DIESEL ENGINES
                    Filed Aug. 16, 1926        2 Sheets-Sheet 1

INVENTOR.
T. E. Sellden.
BY
Townsend, Loftus & Abbett
ATTORNEYS.

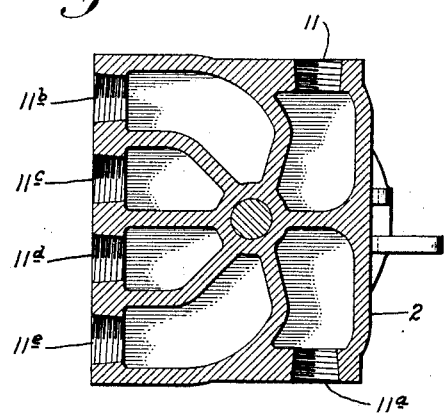
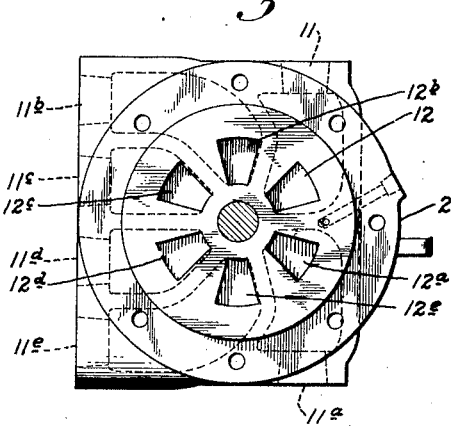
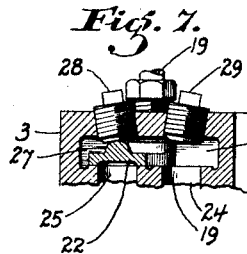
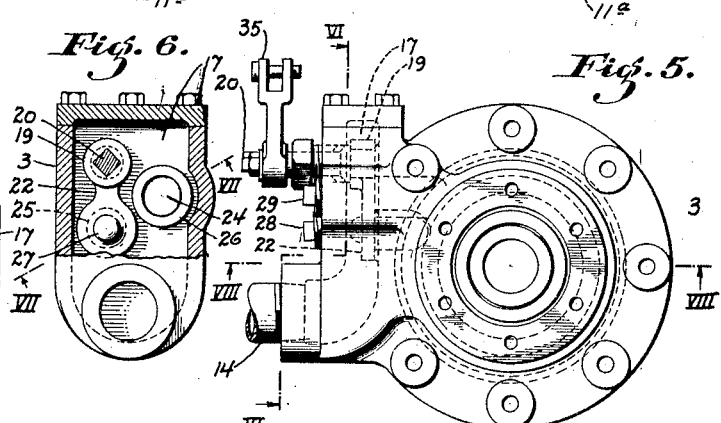
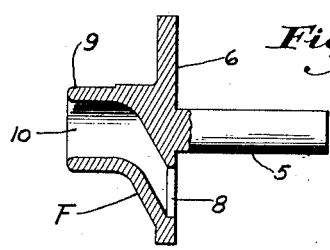
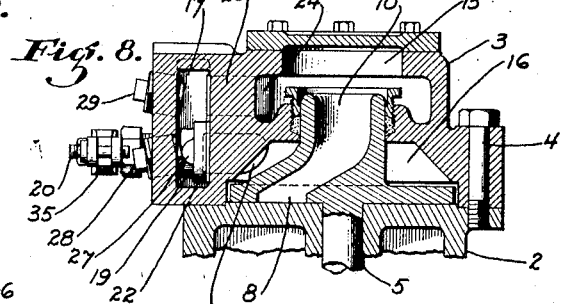
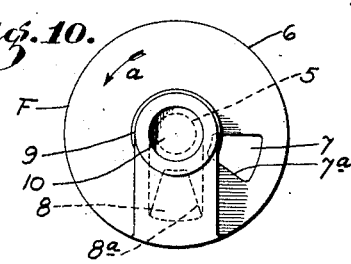

Patented Nov. 12, 1929

1,735,414

UNITED STATES PATENT OFFICE

TOB. E. SELLDEN, OF OAKLAND, CALIFORNIA, ASSIGNOR TO THE UNION GAS ENGINE COMPANY, OF OAKLAND, CALIFORNIA, A CORPORATION OF CALIFORNIA

STARTING AIR DISTRIBUTOR FOR DIESEL ENGINES

Application filed August 16, 1926. Serial No. 129,408.

This invention relates to a starting air distributor or valve mechanism for direct reversible Diesel engines.

The object of the present invention is to generally improve and simplify the construction and operation of starting air distribution or valves for direct reversal of Diesel engines; to provide an air distributor or valve mechanism which may be directly connected and driven by the cam shaft of the engine and further to provide means whereby the valve mechanism or distributor is automatically set or actuated for a proper timing and admission of starting air both for ahead and astern rotation of the engine.

Figure 1:
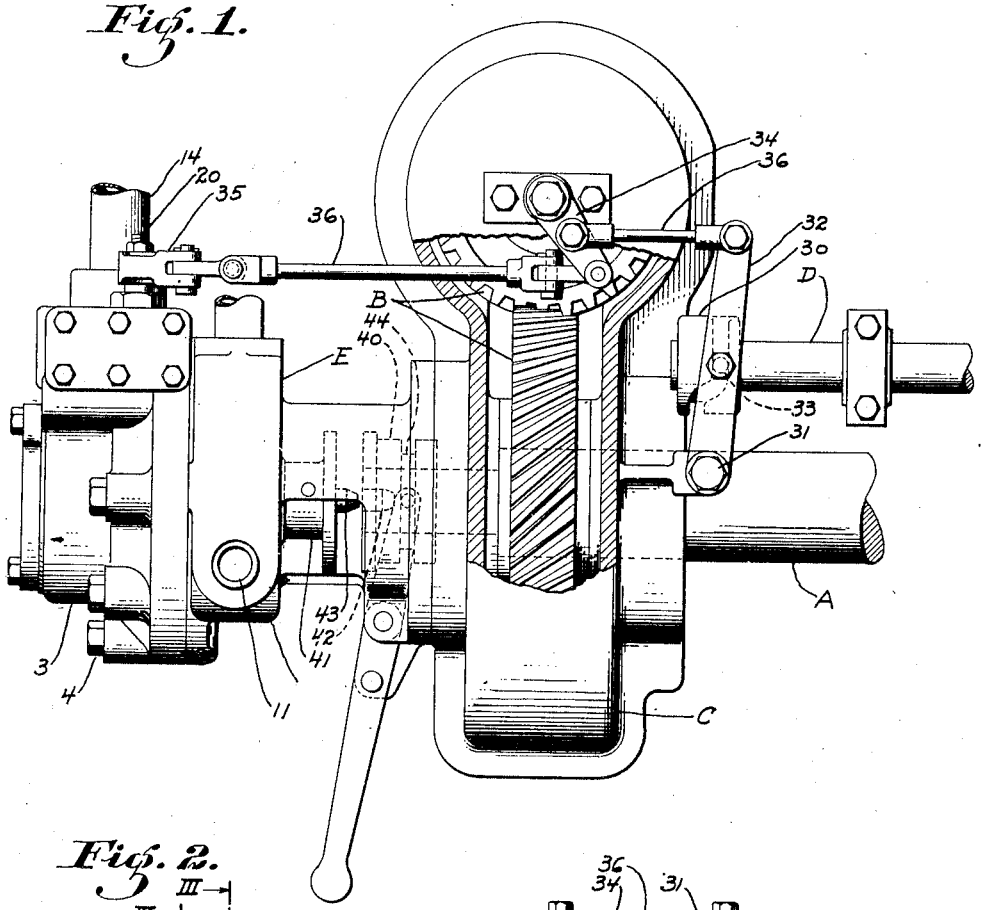
Figure 2:
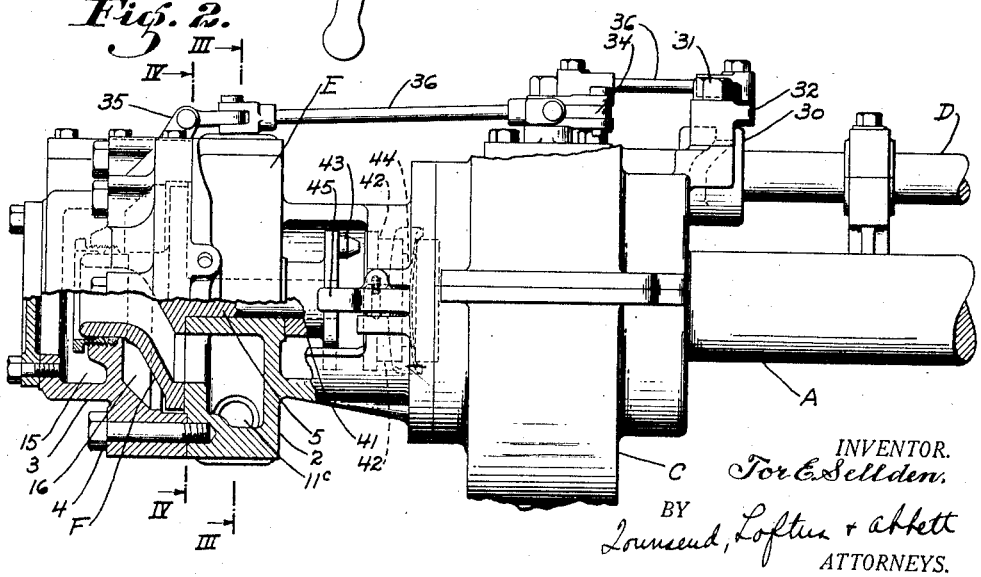

The invention is shown by way of illustration in the accompanying drawings in which:

Figure 1 is a plan view of the housing carrying the air distributing valve mechanism, said view showing the valve housing secured to the gear housing of the cam shaft and adapted to be connected and driven by the cam shaft, Figure 2 is a bottom view, said view showing the valve distributor housing partly in section, Figure 3 is a cross section taken on the line III—III of Figure 2, Figure 4 is a cross section taken on the line IV—IV of Figure 2, Figure 5 is an end view of the valve housing, Figure 6 is a cross section taken on the line VI—VI of Figure 5, Figure 7 is a cross section taken on the line VII—VII of Figure 6, Figure 8 is a cross section taken on the line VIII—VIII of Figure 5, Figure 9 is a cross section of the distributor valve, Figure 10 is an end view of the same.

Referring to the drawings in detail and particularly to Figures 1 and 2, A indicates the cam shaft of a Diesel engine, B the gears whereby the cam shaft is driven, C the gear housing and D a lay or control shaft which parallels the cam shaft and which functions as will hereinafter be described.

Secured on one side of the gear housing C in alignment with the cam shaft A is a housing generally indicated at E. This housing encloses the air distributing valves and the mechanism forming the subject matter of the present application. The housing E consists of two sections generally indicated at 2 and 3. These sections are secured with relation to each other by means of bolts 4 and they enclose a disc type of valve generally indicated at F. This valve being interposed between the housing sections 2 and 3 and serving the function of directing the air to the several cylinders.

The valve proper is best illustrated in Figures 9 and 10. It consists of a stem 5 on the inner end of which is secured or formed a disc 6. Formed in the disc are two ports generally indicated at 7 and 8. The port 8 delivers air for ahead rotation and the port 7 delivers the air for astern rotation. One face of the valve 6 is provided with a hub-like extension 9 and this is centrally cored out to form a central air passage 10 which communicates with the port 8. This structure being resorted to so that air may be delivered separately either to the port 8 or the port 7, as will hereafter be described.

The housing section 2 has six discharge ports formed therein as indicated at 11, $11^a$, $11^b$, $11^c$, $11^d$ and $11^e$, the ports 11 and $11^a$ being formed in the sides of the casing and the ports $11^b$, $11^c$, $11^d$ and $11^e$ being formed in the upper face thereof. These ports are all tapped and adapted to receive air delivering pipes which carry the starting air to the respective cylinders. The valve mechanism shown in the present instance, is designed for application to a six cylinder direct reversible marine type of Diesel engine. It is for this reason that six discharge ports are required. The number of ports may, however, be reduced or increased according to the number of cylinders required.

The inner face of the casing section 2 is flat and forms a seat for the disc valve F. The face is provided with six ports radially disposed as indicated in Figure 4, these ports being indicated at 12 and $12^a$, $12^b$, $12^c$, $12^d$ and $12^e$, the port 12 communicating with the discharge port 11, the port $12^a$ with the discharge port $11^a$ and so on. The rotation of the valve F over the valve seat of the casing section 2 will, accordingly, deliver the air to the respective ports 12, 12ª and so on in successive order and the air will, accordingly, be delivered to the respective pipes and cylinders with which they are connected.

The air to be distributed is delivered by a supply pipe generally indicated at 14. This pipe is connected with the housing section 3 at one end and with a suitable source of air supply under pressure, at is opposite end. The air supply pipe is also provided with a shutoff valve not here illustrated which is only opened when the engine is to be started or when maneuvering ahead or reverse. It should also be understood that the pipes which connect the ports 11, 11ª, etc., with the respective cylinders are provided with check valves and that these valves are placed as close to the cylinders as possible so that air pockets which might effect the compression of the engine are eliminated as much as possible.

Such check valves are in common use in practically all air distributing systems and so is the shutoff valve on the supply pipe and it is for this reason that they are not illustrated.

The housing section 3 of the distributor valve casing is divided into three compartments which are best illustrated in Figure 8. These compartments are indicated at 15, 16 and 17. The compartments 15 and 16 are separated through means of the hub extension 9 of the main distributor valve, that is, a partition is formed between the compartments 15 and 16 and the hub member 9 of the valve extends therethrough. The passage 10 and port 8 will thus constantly be in communication with the chamber 15 while the port 7 will be in constant communication with the chamber 16.

The air supply pipe 14 communicates directly with the chamber 17 and a valve is placed in this chamber which directs the air either into the chamber 15 or the chamber 16, the air being delivered to the chamber 15 when going ahead and to the chamber 16 when the engine is being reversed for astern motion. The valve mounted in the chamber 17 is best illustrated in Figures 5, 6 and 7. It consists of a hub member 19 which is secured on a shaft 20 extending through the outer wall of the casing. The hub member is provided with a short arm 21 which terminates in a valve 22.

The chamber 17 in which the valve is mounted is separated from the chambers 15 and 16 by a transverse wall 23. Two ports 24 and 25 are formed therein. The port 24 communicating with the chamber 15 and the port 25 with the chamber 16. The ports terminate in valve seats indicated at 26 and the valve 22, during rotation of the shaft 19 will accordingly, swing into alignment with one or another of the ports 24 and 25 and will thus admit air to one chamber or another. The upper face of the valve 22 is provided with a rounded knob extension 27 (see Figure 7). A pair of screw plugs 28 and 29 extending through the outer wall of the casing and disposed on slight angles aligning with the ports 24 and 25. These plugs serve the function of engaging the rounded extension 27 of the valve and due to their inclined position, force the valve snugly against one seat or another depending upon the position of the valve. The valve 22 must, of course, assume one position or another depending upon whether the engine is to be started ahead or reversed. It may here be stated that it covers and closes the port 25 when the ahead rotation is desired and vice versa with the port 24 when reverse rotation is desired.

An operator in starting an engine of this character has plenty to do and take care of during the starting operation and while he may manually position the valve 22 for an ahead or reverse position, it would be more desirable if positioning of the valve was automatically taken care of. Such automatic positioning has been take care of in the present instance and will be more fully described.

By referring to Figure 1, it will be noted that the outer end of the lay or control shaft is indicated at D. This shaft serves the normal function of automatically positioning the rollers on the fuel rocker arms so as to engage either the ahead fuel cams or the reverse fuel cams as the case may be. The shaft is rotated through an arc of 180° by means of a hand wheel or the like not here shown. Suffice it to say that when the lay shaft assumes one position the rollers on the fuel rocker arms are rotated and when the lay shaft is rotated 180° in a reverse direction the rollers on the rocker arms will be correctly positioned for reverse rotation.

This movement of the lay shaft has been taken advantage of to automatically position the valve 22. This is accomplished as follows:—

Secured on the end of the lay shaft is a cam member 30 (see Figure 1). Pivotally mounted on the gear housing as at 31, is a rocker lever 32 and carried thereby is a pin 33 which is engaged by the cam. Rotation of the lay shaft and the cam 30 will, accordingly, move the rocker lever 32 in one direction or another and this movement is transmitted to partially rotate the shaft 19 and thereby automatically position the valve 22.

The motion of the rocker lever 32 being transmitted through the rocker arms 34 and 35 and the intermediate connecting links 36. The link 36 is attached to the rocker arm 32 and the rocker 34 and the link 36 connects the rocker arm 34 and the rocker arm 35 which is secured on the shaft 19. It is, accordingly, obvious that proper positioning of the valve 22 is automatically obtained through the operation of other means which are controlled and actuated from the operator's stand.

As a distributor valve of this character is only required when starting or maneuvering with the engine, it is obvious that continuous rotation of the valve F is not required and a clutch has, accordingly, been provided which may be disengaged at will or whenever maneuvering will not be required for some time, thus reducing wear on the distributor valve and the co-operating seat.

The clutch is formed in two parts and is best illustrated in Figures 1 and 2. One part of the clutch is keyed or splined on the end of the cam shaft as indicated at 40 while the other part of the clutch is keyed or otherwise secured on the stem 5 of the distributor valve as indicated at 41. The face of the clutch section 40 is provided with a recess as indicated by dotted lines at 42 and the face of the clutch section 40 is provided with a pin 43. The clutch section 40 is also provided with an annular groove 44 and this is engageable by a forked operating lever 45.

The clutch 40 is, of course, splined on the end of the shaft and as such may be moved into or out of engagement with the clutch section 41, the pin 43 forming the driving connection and furthermore insures the proper positioning of the valve F, with relation to the came shaft.

When starting or maneuvering the clutch sections are connected and when maneuvering will not be required for a considerable time the clutch sections are disconnected.

In actual operation, it will be understood that the distributing valve F rotates with the cam shaft in the direction of the arrow $a$ when the engine is rotating ahead and the valve 22 automatically closes the port 25, at this time, so that air will enter the chamber 15 and discharge through the passage 10 and port 8 which successively delivers the air to the ports 12, 12$^a$, etc., and the connected ports 11, 11$^a$, etc. The air discharging from the latter ports being delivered to the respective cylinders through the connected pipes and check valves as previously described.

The position of the port 8 is such that the air is delivered during the burning cycle or downward stroke of the piston, just after they have passed top or dead center and the air is discharged through the exhaust valves during the return or upward stroke of the piston. On the other hand, when reversing or going astern, the valve 2 is automatically positioned to close the port 24 and the starting air will thus enter the chamber 16 from where it is distributed to the successive ports 12, 12$^a$ and 11, 11$^a$, etc., and the connected pipes through the port 7 of the distributing valve. This port being so positioned that the air reaches the cylinders just after the pistons pass top or dead center when the crank shaft is reversed and, of course, during the burning cycle so that the air may be exhausted during the next upward stroke of the pistons through the exhaust valves.

It is due to the fact that the starting air must not enter the cylinders until the pistons have passed top or dead center whether rotating ahead or reverse that the two ports 7 and 8 are required in the distributing valve. The leading edges 7$^a$ and 8$^a$ of the respective ports are, in this instance, separated by approximately 33°, which corresponds to an angle of 16½° of the movement of the crank shaft or pistons. In other words, the air is admitted after the piston has passed top or dead center approximately 8°.

This angle may, however, be changed to suit varying installations and crank shaft speeds, but, in this instance, is merely referred to as a matter of explanation. Other features of the invention have also been described in more or less detail, and I wish it understood that various changes may be resorted to from time to time, within the scope of the appended claims. Similarly that the materials and finishes of the several parts employed may be such as the manufacturer may decide or varying conditions or uses may demand.

Having thus described my invention, what I claim and desire to secure by Letters Patent is:—

1. A starting air distributor of the character described, comprising a casting having a plurality of chambers formed therein, said casting also having a plurality of inlet ports formed in one face which communicate with the respective chambers, a second casting secured to the first named casting, a disc valve mounted within the second named casting and engaging the face of the first named casting in which the inlet ports are formed, said disc valve having two ports formed therein, means for rotating the disc valve so as to bring the ports into and out of register with the inlet ports in the first named casting, a partition plate in the second named casting dividing the second named casting into two chambers with a stuffing box in said partition, an extension on the disc valve extending through the stuffing box, said extension having a port formed therein which communicates with one of the ports in the disc valve, and means for admitting air under pressure to one or another of the chambers formed in the second named casting.

2. A starting air distributor of the character described, comprising a casting having a plurality of chambers formed therein, said casting also having a plurality of inlet ports formed in one face which communicate with the respective chambers, a second casting secured to the first named casting, a disc valve mounted within the second named casting and engaging the face of the first named casting in which the inlet ports are formed, said disc valve having two ports formed therein, means for rotating the disc valve so as to bring the ports into and out of register with the inlet ports in the first named casting, a partition plate in the second named casting dividing the second named casting into two chambers with a stuffing box in said partition, an extension on the disc valve extending through the stuffing box, said extension having a port formed therein which communicates with one of the ports in the disc valve, a valve connected with the second named housing, and means for delivering air under pressure to said valve, said valve adapted to direct the air to one or another of the chambers formed in the second named housing.

3. A starting air distributor of the character described, comprising a casting having a plurality of chambers formed therein, said casting also having a plurality of inlet ports formed in one face which communicate with the respective chambers, a second casting secured to the first named casting, a disc valve mounted within the second named casting and engaging the face of the first named casting in which the inlet ports are formed, said disc valve having two ports formed therein, means for rotating the disc valve so as to bring the ports into and out of register with the inlet ports in the first named casting, a partition plate in the second named casting dividing the second named casting into two chambers with a stuffing box in said partition, an extension on the disc valve extending through the stuffing box, said extension having a port formed therein which communicates with one of the ports in the disc valve, said second named housing having a third chamber formed therein and said second named casing having two ports formed therein, one communicating with one chamber in the second named housing and the second with the other chamber, both of said ports communicating with the third chamber, a valve stem entering said third chamber, a valve mounted on the stem within the chamber, means for imparting a rotary movement to the stem and the valve so as to swing the valve from one port or the other, and a pair of cam members aligning with the ports and engageable with the valve to retain it in tightly closed position when covering one port or the other.

TOR E. SELLDEN.